United States Patent
Kanno

(10) Patent No.: US 11,292,467 B2
(45) Date of Patent: Apr. 5, 2022

(54) VEHICLE CONTROL SYSTEM

(71) Applicant: TOYOTA JIDOSHA KABUSHIKI KAISHA, Toyota (JP)

(72) Inventor: Yoshihito Kanno, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 16/583,716

(22) Filed: Sep. 26, 2019

(65) Prior Publication Data
US 2020/0122723 A1  Apr. 23, 2020

(30) Foreign Application Priority Data

Oct. 23, 2018  (JP) .............................. JP2018-199180

(51) Int. Cl.
| | |
|---|---|
| *B60W 30/18* | (2012.01) |
| *B60W 10/04* | (2006.01) |
| *B60W 50/08* | (2020.01) |
| *B60W 50/10* | (2012.01) |

(52) U.S. Cl.
CPC ............ *B60W 30/18* (2013.01); *B60W 10/04* (2013.01); *B60W 50/082* (2013.01); *B60W 50/10* (2013.01); *B60W 2400/00* (2013.01); *B60W 2520/10* (2013.01); *B60W 2520/105* (2013.01); *B60W 2540/10* (2013.01); *B60W 2720/106* (2013.01)

(58) Field of Classification Search
None
See application file for complete search history.

(56) References Cited

U.S. PATENT DOCUMENTS

| | | | |
|---|---|---|---|
| 2002/0107106 A1* | 8/2002 | Kato | ..................... F16H 61/143 477/110 |
| 2014/0288757 A1* | 9/2014 | Hirasawa | .............. B60W 20/10 701/22 |
| 2015/0019091 A1 | 1/2015 | Okada et al. | |

FOREIGN PATENT DOCUMENTS

JP         2015-017570 A       1/2015

* cited by examiner

*Primary Examiner* — Genna M Mott
(74) *Attorney, Agent, or Firm* — Oliff PLC

(57) ABSTRACT

A vehicle control system configured to operate a vehicle in line with a driver's intention in respective operating mode. An operating mode of the vehicle is select from a normal mode in which a first acceleration characteristic is employed, and a sport mode in which a second acceleration characteristic to propel the vehicle in a dynamic manner is employed. In the normal mode, a controller increases a target acceleration with an increase in depression of an accelerator at a first change rate, and decreases the target acceleration with an increase in a vehicle speed at a second change rate. In the sport mode, the controller increases the target acceleration with an increase in depression of the accelerator at the first change rate, and decreases the target acceleration with an increase in the vehicle speed at a third change rate smaller than the second change rate.

3 Claims, 10 Drawing Sheets

VEHICLE CONTROL SYSTEM

CROSS REFERENCE TO RELATED APPLICATIONS

The present disclosure claims the benefit of Japanese Patent Application No. 2018-199180 filed on Oct. 23, 2018 with the Japanese Patent Office, the disclosure of which are incorporated herein by reference in its entirety.

BACKGROUND

Field of the Disclosure

Embodiments of the present application relate to the art of a vehicle control system configured to set a target acceleration based on an accelerating operation executed by a driver.

Discussion of the Related Art

US 2015/019091 A1 describes a vehicle control system configured to set a target acceleration based on an accelerator angle. The vehicle control system taught by US 2015/019091 A1 is capable of selectively setting one of a normal-mode and a sport-mode as a vehicle travel mode. A difference between the sport-mode target acceleration and the normal-mode target acceleration becomes smaller along with an increase in the vehicle speed, when compared under the same condition in terms of the accelerator angle. A target acceleration is calculated based on the target acceleration characteristics, and an output torque of an engine is controlled on the basis of the target acceleration and a gear ratio of a transmission connected to the engine.

According to the teachings of US 2015/019091 A1, a sport-mode target acceleration is greater than a normal-mode target acceleration, and as described, the difference between the sport-mode target acceleration and the normal-mode target acceleration becomes smaller along with an increase in the vehicle speed. For these reasons, it is possible to enhance vehicle accelerating performance during the sport mode in response to a driver's aggressive intension to further accelerate the vehicle, while suppressing deterioration in fuel economy performance in the sport-mode. According to the teachings of US 2015/019091 A1, however, the driver's intension may not be realized properly in the sport-mode. As described, according to the teachings of US 2015/019091 A1, the target acceleration characteristics are set in each travel mode, in accordance with the accelerator angle. That is, the target acceleration with respect to the accelerator angle is differentiated in the normal-mode and the sport-mode. For this reason, as indicated in FIG. 1 an increasing rate of the target acceleration in the sport-mode in a specific condition (e.g., lower than 100 km/h) is smaller than that in the normal-mode within the region R. In the region R, therefore, acceleration of the vehicle is increased in a milder manner in the sport-mode although the driver selects the sport-mode to accelerate the vehicle sharply.

SUMMARY

Aspects of the present disclosure have been conceived noting the foregoing technical problems, and it is therefore an object of the present invention to provide a vehicle control system configured to operate a vehicle in line with a driver's intention in respective operating mode such as a normal mode and a sport mode.

The vehicle control system according to the embodiment of the present invention comprises a detector that detects an operating amount of an accelerator and a speed of a vehicle, and a controller that controls the vehicle. The controller is configured to: set an acceleration characteristic determining a relation among a target acceleration, the operating amount of the accelerator, and the speed of the vehicle; calculate the target acceleration with respect to the operating amount of the accelerator or the speed of the vehicle based on the acceleration characteristic; control an acceleration of the vehicle based on the calculated target acceleration; and select an operating mode of the vehicle from a normal mode in which a first acceleration characteristic as a standard acceleration characteristic is employed, and a sport mode in which a second acceleration characteristic to propel the vehicle in a dynamic manner is employed. In order to achieve the above-explained objective, according to the embodiment of the present invention, the controller is further configured to: increase the target acceleration in accordance with an increase in the operating amount of the accelerator at a first change rate, and decrease the target acceleration in accordance with an increase in the speed of the vehicle at a second change rate, when the first acceleration characteristic is employed in the normal mode; and increase the target acceleration in accordance with an increase in the operating amount of the accelerator at the first change rate, and decrease the target acceleration in accordance with an increase in the speed of the vehicle at a third change rate that is smaller than the second change rate, when the second acceleration characteristic is employed in the sport mode.

In a non-limiting embodiment, the controller may be further configured to: decrease the target acceleration in accordance with an increase in the speed of the vehicle at a fourth change rate that is smaller than the second change rate in a high-acceleration range that is higher than a reference acceleration value, and decrease the target acceleration in accordance with an increase in the speed of the vehicle at a fifth change rate that is greater than the fourth change rate in a low-acceleration range that is lower than the reference acceleration value, when the first acceleration characteristic is employed in the normal mode; and decrease the target acceleration in accordance with an increase in the speed of the vehicle at a sixth change rate that is smaller than the third change rate in the high-acceleration range, and decrease the target acceleration in accordance with an increase in the speed of the vehicle at a seventh change rate that is greater than the sixth change rate in the low-acceleration range, when the second acceleration characteristic is employed in the sport mode.

In a non-limiting embodiment, the controller may be further configured to: decrease the target acceleration in accordance with an increase in the speed of the vehicle at an eighth change rate that is greater than the second change rate in a low-speed range that is lower than a lower boundary speed, decrease the target acceleration in accordance with an increase in the speed of the vehicle at a ninth change rate that is smaller than the eighth change rate in a mid-speed range that is higher than the lower boundary speed but lower than a higher boundary speed, and decrease the target acceleration in accordance with an increase in the speed of the vehicle at a tenth change rate that is greater than the ninth change rate in a high-speed range that is higher than the higher boundary speed, when the first acceleration characteristic is employed in the normal mode; and decrease the target acceleration in accordance with an increase in the speed of the vehicle at an eleventh change rate that is greater than the third change rate in the low-speed range, decrease the target acceleration in accordance with an increase in the speed of the vehicle at a twelfth change rate that is smaller than the eleventh change rate in the mid-speed range, and decrease the target acceleration in accordance with an increase in the speed of the vehicle at a thirteenth change rate that is greater than the twelfth change rate in the high-speed range, when the second acceleration characteristic is employed in the sport mode.

Thus, according to at least one embodiment of the present invention, the operating mode of the vehicle to which the vehicle control system is applied can be selected from the normal mode as a standard mode and the sport mode in which the vehicle is propelled in a dynamic manner. When the first acceleration characteristic is employed in the normal mode, the target acceleration is increased in accordance with an increase in the operating amount of the accelerator at the first change rate, and the target acceleration is decreased in accordance with an increase in the speed of the vehicle at the second change rate. In the normal mode, therefore, the target acceleration can be reduced sensitively in accordance with an increase in the vehicle speed compared to the sport mode. That is, given that the accelerator is operated in a predetermined amount, the target acceleration is promptly reduced to zero. When the target acceleration is thus reduced to zero, the vehicle is propelled at a constant speed by maintaining an operating amount of the accelerator, and the vehicle speed is changed in accordance with a change in the operating amount of the accelerator. That is, in the normal mode, the speed of the vehicle is determined by fixing the operating amount of the accelerator. In the normal mode, therefore, a driver is allowed to control the vehicle speed easily by manipulating the accelerator.

Whereas, when the second acceleration characteristic is employed in the sport mode, the target acceleration is increased in accordance with an increase in the operating amount of the accelerator at the first change rate, but the target acceleration is decreased in accordance with an increase in the speed of the vehicle at the third change rate that is smaller than the second change rate. As described, the increasing rate of the target acceleration with respect to an increase in the operating amount of the accelerator will not be changed even if the operating mode is shifted between the normal mode and the sport mode. That is, sensitivity of the target acceleration with respect to the operating amount of the accelerator will not be changed even if the operating mode is shifted. In the sport mode, therefore, the vehicle can be propelled in a dynamic manner while preventing the driver from feeling uncomfortable feeling, when shifting the operating mode from the normal mode to the sport mode. In addition, in the sport mode, the sensitivity of the target acceleration with respect to the vehicle speed is reduced compared to the normal mode. Therefore, the target acceleration will not be reduced easily even if the vehicle speed is increased. That is, the target acceleration strongly depends on the operating amount of the accelerator. In the sport mode, when the accelerator is operated by the driver in a predetermined amount to accelerate the vehicle, the target acceleration greater than zero is set continuously so that the vehicle is accelerated easily. In the sport mode, therefore, the driver is allowed to control the longitudinal acceleration of the vehicle easily by manipulating the accelerator.

Thus, the speed of the vehicle may be controlled easily in the normal mode by manipulating the accelerator, and the acceleration of the vehicle may be controlled easily in the sport mode by manipulating the accelerator. In addition, in the sport mode, the acceleration may be changed in a dynamic manner in response to an operation of the accelerator. According to the embodiment of the present invention, therefore, the vehicle can be operated in line with the driver's intention in each operating mode.

According another embodiment of the present invention, in both of the normal mode and the sport mode, the change rate (i.e., reduction rate) of the target acceleration in accordance with an increase in the vehicle speed is increased in the low-acceleration range, and reduced in the high-acceleration range. According to another embodiment, therefore, speed of the vehicle can be controlled easily in the low-acceleration range, and acceleration of the vehicle can be controlled easily in the high-acceleration range. For these reasons, the vehicle can be operated in line with the driver's intention based on the target acceleration.

In the low-speed range, it is required to control the vehicle speed easily to launch or accelerate the vehicle smoothly. To this end, according to still another embodiment, the change rate (i.e., reduction rate) of the target acceleration with respect to an increase in the vehicle speed is increased in the low-speed range irrespective of the selected operating mode. In the mid-speed range, the vehicle is accelerated and decelerated frequently. Therefore, in order to control the acceleration easily, the reduction rate of the target acceleration with respect to an increase in the vehicle speed is reduced in the mid-speed range. The vehicle will be propelled at a high speed when e.g., travelling on an expressway. In the high-speed range, therefore, the reduction rate of the target acceleration with respect to an increase in the vehicle speed is also increased to control the vehicle speed easily. For these reasons, the vehicle can be operated in line with the driver's intention depending on the running condition and speed of the vehicle.

BRIEF DESCRIPTION OF THE DRAWINGS

Features, aspects, and advantages of exemplary embodiments of the present disclosure will become better understood with reference to the following description and accompanying drawings, which should not limit the invention in any way.

DETAILED DESCRIPTION OF THE PREFERRED EMBODIMENT(S)

Embodiments of the present invention will now be explained with reference to the accompanying drawings. Note that the embodiments shown below are merely examples of the present invention, and do not limit a scope of the present invention.

Figure 1:
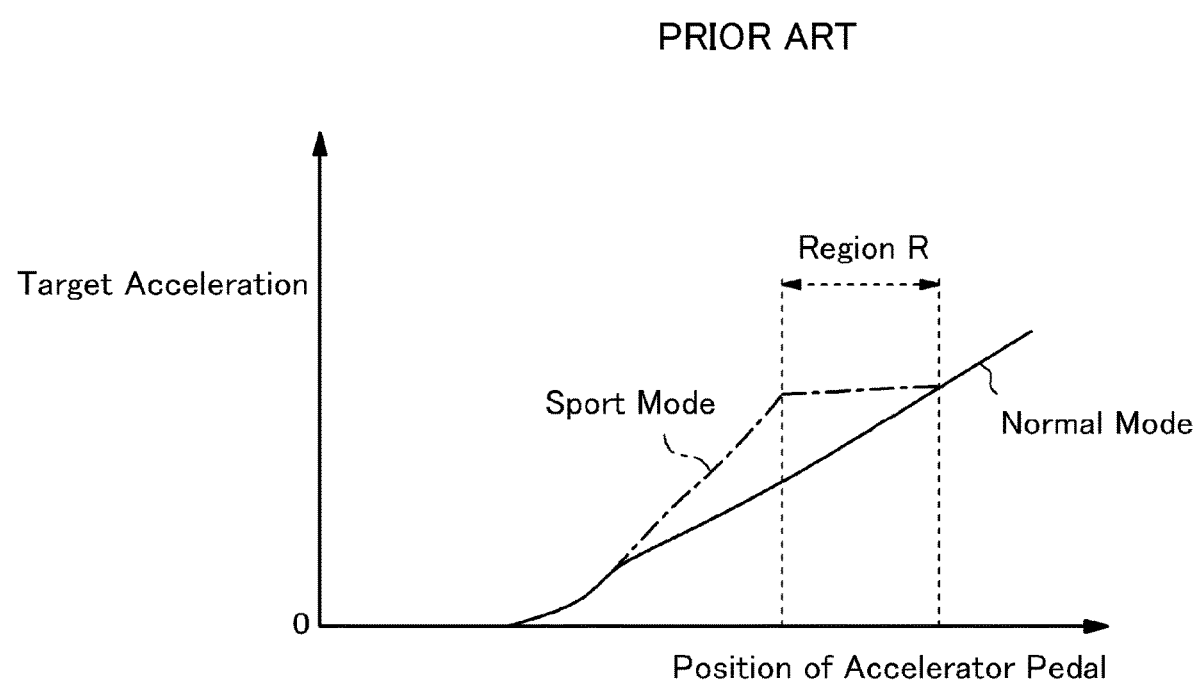
FIG. 1 is a graph indicating an increasing rates of target acceleration in the sport-mode and the normal-mode according to the prior art.
Figure 2:
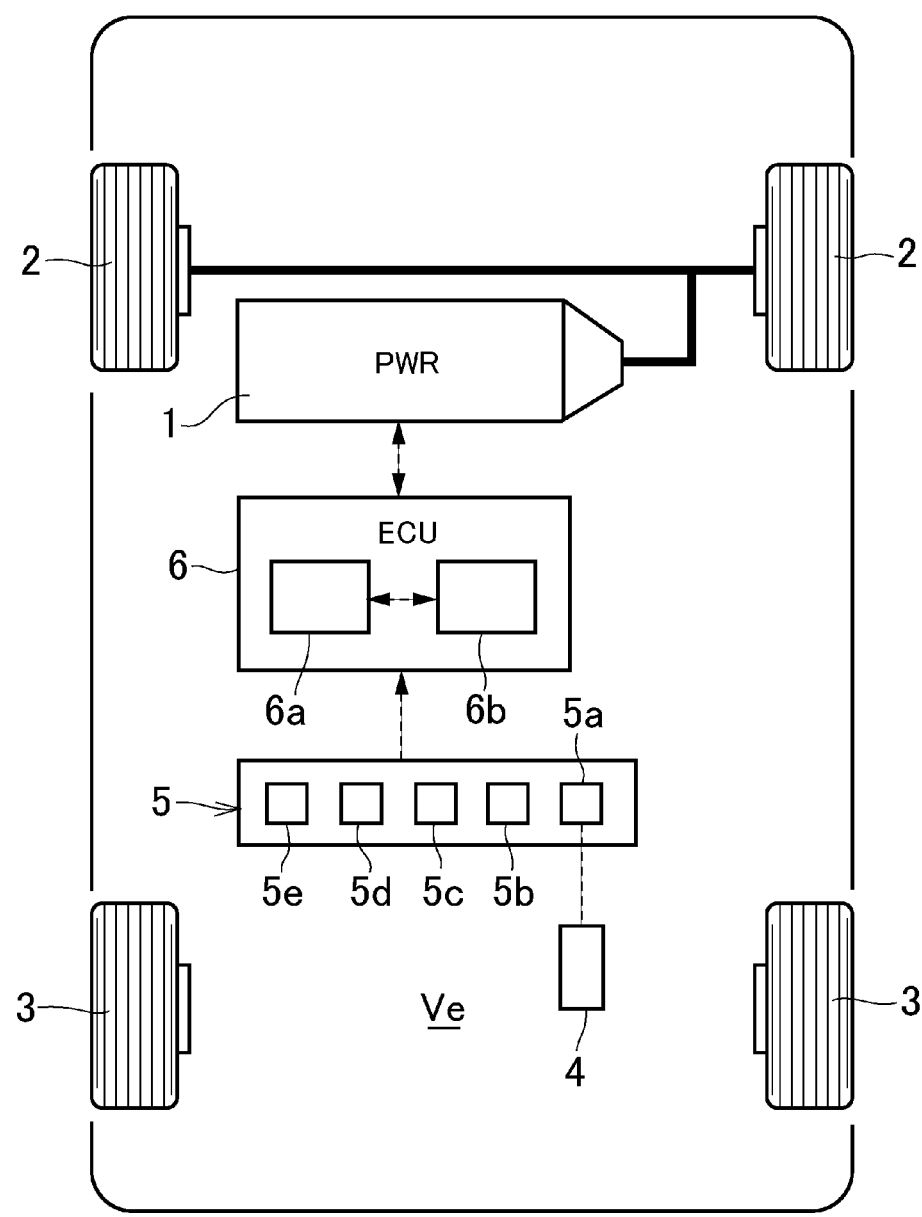
FIG. 2 is a schematic illustration showing one example of a structure of the vehicle to which the control system according to the embodiment of the present invention is applied.

Referring now to FIG. 2, there is shown an example of a drive system of a vehicle Ve to which the control system according to the embodiment of the present invention is applied. The vehicle Ve illustrated in FIG. 2 comprises a prime mover (referred to as "PWR" in FIG. 1) 1, a pair of front wheels 2, a pair of rear wheels 3, an accelerator pedal 4, a detector 5, and a controller (referred to as "ECU" in FIG. 1) 6.

The prime mover 1 generates a drive torque to establish a driving force to propel the vehicle Ve. For example, an internal combustion engine such as a gasoline engine and a diesel engine may be adopted as the prime mover 1. An output power of the engine may be adjusted electrically, and the engine may be started and stopped electrically according to need. Given that the gasoline engine is used as the prime mover 1, an opening degree of a throttle valve, an amount of fuel supply or fuel injection, a commencement and a termination of ignition, an ignition timing etc. may be controlled electrically. Otherwise, given that the diesel engine is used as the prime mover 1, an amount of fuel injection, an injection timing, an opening degree of a throttle valve of an EGR (Exhaust Gas Recirculation) system etc. may be controlled electrically.

Further, a permanent magnet type synchronous motor, and an induction motor may be adopted as the prime mover 1. Those kinds of motors may serve not only as a motor to generate torque when driven by electricity supplied thereto, but also as a generator to generate electricity when rotated by a torque applied thereto. That is, a motor-generator may also be adopted as the prime mover 1. In this case, the prime mover 1 is switched between a motor and a generator by electrically controlling the prime mover 1, and an output speed and an output torque of the prime mover 1 may be controlled electrically.

In the vehicle Ve shown in FIG. 2, the front wheels 2 serve as drive wheels, and a drive torque generated by the prime mover 1 is delivered to the front wheels 2 to propel the vehicle Ve. However, the vehicle control system according to the embodiment of the present invention may also be applied to a rear-drive layout vehicle in which the rear wheels serve as drive wheels, and a four-wheel drive vehicle in which all of the wheels are driven by the torque of the prime mover 1. In a case of using the engine as the prime mover 1, a transmission may be arranged downstream of the prime mover 1 to deliver the output torque of the prime mover 1 to the drive wheels via the transmission.

The vehicle Ve is accelerated in accordance with an operating amount of an accelerator and a vehicle speed. To this end, the vehicle control system controls an output power of the prime mover 1 in such a manner as to achieve a target acceleration set based on an operating amount of an accelerator and a vehicle speed. In the vehicle Ve, specifically, an accelerating operation is executed by depressing the accelerator pedal 4, and the drive torque generated by the prime mover 1 is increased in accordance with a position of the accelerator pedal 4. In other words, the drive torque generated by the prime mover 1 is increased in response to an increase in a depression of the accelerator pedal 4 thereby increasing the driving force to propel the vehicle Ve. By contrast, the drive torque generated by the prime mover 1 is reduced by returning the accelerator pedal 4. In other words, the drive torque generated by the prime mover 1 is reduced in response to a reduction in a depression of the accelerator pedal 4 thereby reducing the driving force to propel the vehicle Ve. Given that the engine is adopted as the prime mover 1, an engine braking force derived from a friction torque and a pumping loss is applied to the vehicle Ve when the accelerator pedal 4 is returned. By contrast, given that the motor-generator is adopted as the prime mover 1, a regenerative braking force derived from a regenerative torque of the motor-generator is applied to the vehicle Ve when the accelerator pedal 4 is returned.

Thus, the acceleration of the vehicle Ve is controlled by manipulating the accelerator pedal 4 to adjust the driving force and the braking force. For this purpose, the accelerator pedal 4 is provided with an accelerator position sensor 5a to detect a position (i.e., a depression) and an operating speed of the accelerator pedal 4. By detecting an operating speed of the accelerator pedal 4, an operating direction of the accelerator pedal 4 can be estimated. That is, it is possible to determine whether the accelerator pedal 4 is depressed or returned by a driver.

The detector 5 collects data about conditions of the vehicle Ve. Specifically, the detector 5 comprises: the above-mentioned accelerator position sensor 5a that detect e.g., a position of the accelerator pedal 4; a wheel speed sensor 5b that detects a speed of the vehicle Ve; a brake stroke sensor 5c that detects an operating amount (i.e., a depression or stroke) of a brake pedal (not shown); an acceleration sensor 5d that detects a longitudinal acceleration of the vehicle Ve; and a speed sensor 5e that detects a rotational speed of an output shaft (not shown) of the prime mover 1. The detector 5 is electrically connected to an after-mentioned controller 6 so that detection values obtained by those sensors are transmitted to the controller 6 in the form of an electric signal.

Specifically, the controller 6 is an electronic control unit including a microcomputer. In order to control the vehicle Ve, the data collected by the detector 5 is sent to the controller 6, and the controller 6 performs calculation using the incident data from the detector 5, and data and formulas stored in advance. Calculation results are transmitted from the controller 6 in the form of command signal.

The controller 6 comprises a calculator section 6a, and a controller section 6b. For example, a position of the accelerator pedal 4 as an operating amount of the accelerator detected by the accelerator position sensor 5a and a vehicle speed detected by the wheel speed sensor 5b are sent to the calculator section 6a, and the calculator section 6a calculates a target acceleration and a target drive torque of the vehicle Ve based on the data transmitted from those sensors. On the other hand, the controller section 6b controls longitudinal acceleration of the vehicle Ve in accordance with the position of the accelerator pedal 4 in such a manner as to achieve the target acceleration calculated by the calculator section 6a. Specifically, the controller section 6b transmits command signals to control the driving force and the braking force to achieve the target acceleration calculated by the calculator section 6a.

Thus, the controller 6 sets a target acceleration based on a depression of the accelerator pedal 4, and controls a driving force and a braking force in such a manner as to achieve the target acceleration. Although only one controller 6 is depicted in FIG. 2, a plurality of controllers may be arranged in the vehicle Ve to control the specific devices individually.

An operating mode of the vehicle Ve to which the vehicle control system according to the embodiment of the present invention is applied may be selected from at least a normal mode or a standard mode in which the vehicle Ve is accelerated in a normal manner, and a dynamic mode or a sports mode in which the vehicle Ve is accelerated in a dynamic manner. In order to select the operating mode, the vehicle Ve is provided with a selector device such as a selector switch and a selector lever (neither of which are shown) that is operated by a driver to select the operating mode. The operating mode of the vehicle Ve may also be switched automatically by the controller 6 depending on a running condition and a running environment among a plurality of modes including the normal mode and the sport mode. That is, in the vehicle Ve, a selecting mode of the operating mode may be selected from a manual mode in which the operating mode is selected manually by the driver, and an automatic mode in which the operating mode is selected automatically by the controller 6.

The controller 6 is configured to propel a vehicle in line with the driver's intention in each operating mode such as the normal mode and the sport mode. For this purpose, the controller 6 changes acceleration characteristic between the normal mode and the sport mode. Specifically, in the normal mode, the controller 6 employs a first acceleration characteristic as a standard characteristic, and in the sport mode, the controller 6 employs a second acceleration characteristic to propel the vehicle Ve in a dynamic manner.

The acceleration characteristic is governed by an operating amount of the accelerator, a vehicle speed, and a target acceleration. For example, the acceleration characteristic may be determined by a predetermined formula, a control map, a control table etc. By changing the acceleration characteristic, it is possible to change a drive feel of the vehicle Ve.

The vehicle control system according to the embodiment of the present invention may be applied to vehicles in which acceleration is changed by operating an accelerator pedal, a throttle lever, a throttle grip and so on. Specifically, the vehicle Ve shown in FIG. 2 is accelerated by depressing the accelerator pedal 4. In other words, the vehicle Ve shown in FIG. 2 is accelerated in accordance with a position of the accelerator pedal 4.

As described, in the normal mode, the controller 6 employs the first acceleration characteristic as a standard acceleration characteristic. In a case that the first acceleration characteristic is employed, a target acceleration is increased in accordance with an increase in depression of the accelerator pedal 4 at a first change rate, and decreased in accordance with an increase in a vehicle speed at a second change rate. Specifically, the first acceleration characteristic is determined with reference to maps shown in FIGS. 3 and 4.

Figure 3:
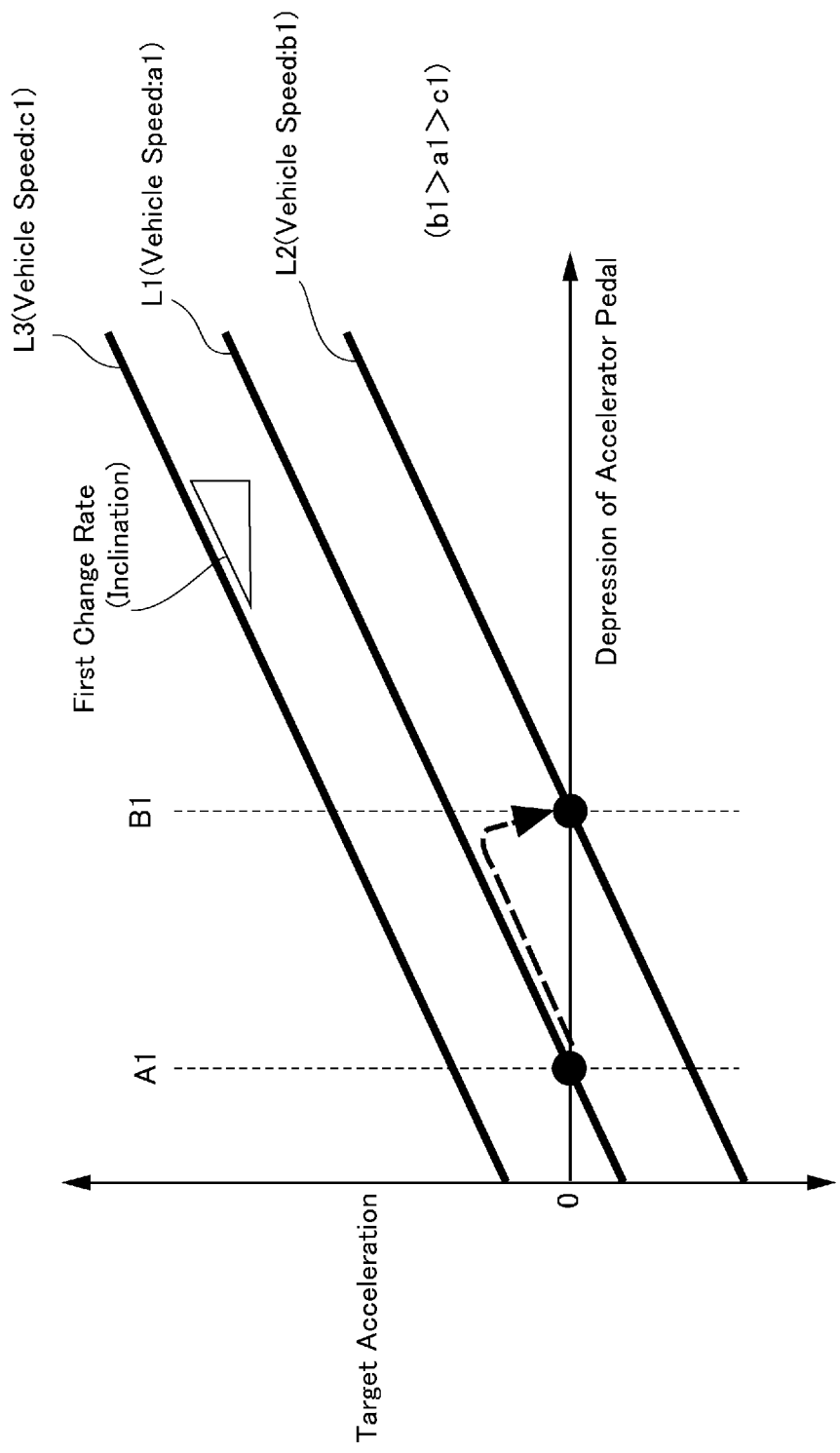
FIG. 3 is a map determining the target acceleration with respect to a position of an accelerator pedal in the normal mode at the first change rate.

Specifically, FIG. 3 is a map determining the target acceleration with respect to the position of the accelerator pedal 4 in the normal mode at the first change rate. In FIG. 3, the line L1 indicates a relation between the target acceleration and the position of the accelerator pedal 4 given that the vehicle speed is a1, the line L2 indicates a relation between the target acceleration and the position of the accelerator pedal 4 given that the vehicle speed is b1, and the line L3 indicates a relation between the target acceleration and the position of the accelerator pedal 4 given that the vehicle speed is c1. Here, the vehicle speed b1 is faster than the vehicle speed a1, and the vehicle speed a1 is faster than the vehicle speed c1 (b1>a1>c1). As can be seen from FIG. 3, inclinations of the lines L1, L2, and L3 (i.e., the first change rate) are identical to one another.

In the case that the first acceleration characteristic is employed in the normal mode, as shown in FIG. 3, the target acceleration is increased in accordance with an increase in depression of the accelerator pedal 4 at the first change rate. Specifically, the first change rate is a ratio of a change amount of a position of the accelerator pedal 4 to a change amount of the target acceleration, and in FIG. 3, the first change rate is indicated as an inclination of each of the lines L1, L2, and L3. According to the embodiment of the present invention, the ratio between the change amount of a position of the accelerator pedal 4 and the change amount of the target acceleration is set to the first change rate as a fixed rate. That is, the target acceleration is increased in accordance with an increase in depression of the accelerator pedal 4 at the first change rate in both of the normal mode and the sport mode. In other words, an increasing rate of the target acceleration with respect to an increase in depression of the accelerator pedal 4 will not be changed even if the operating mode is shifted between the normal mode and the sport mode.

Figure 4:
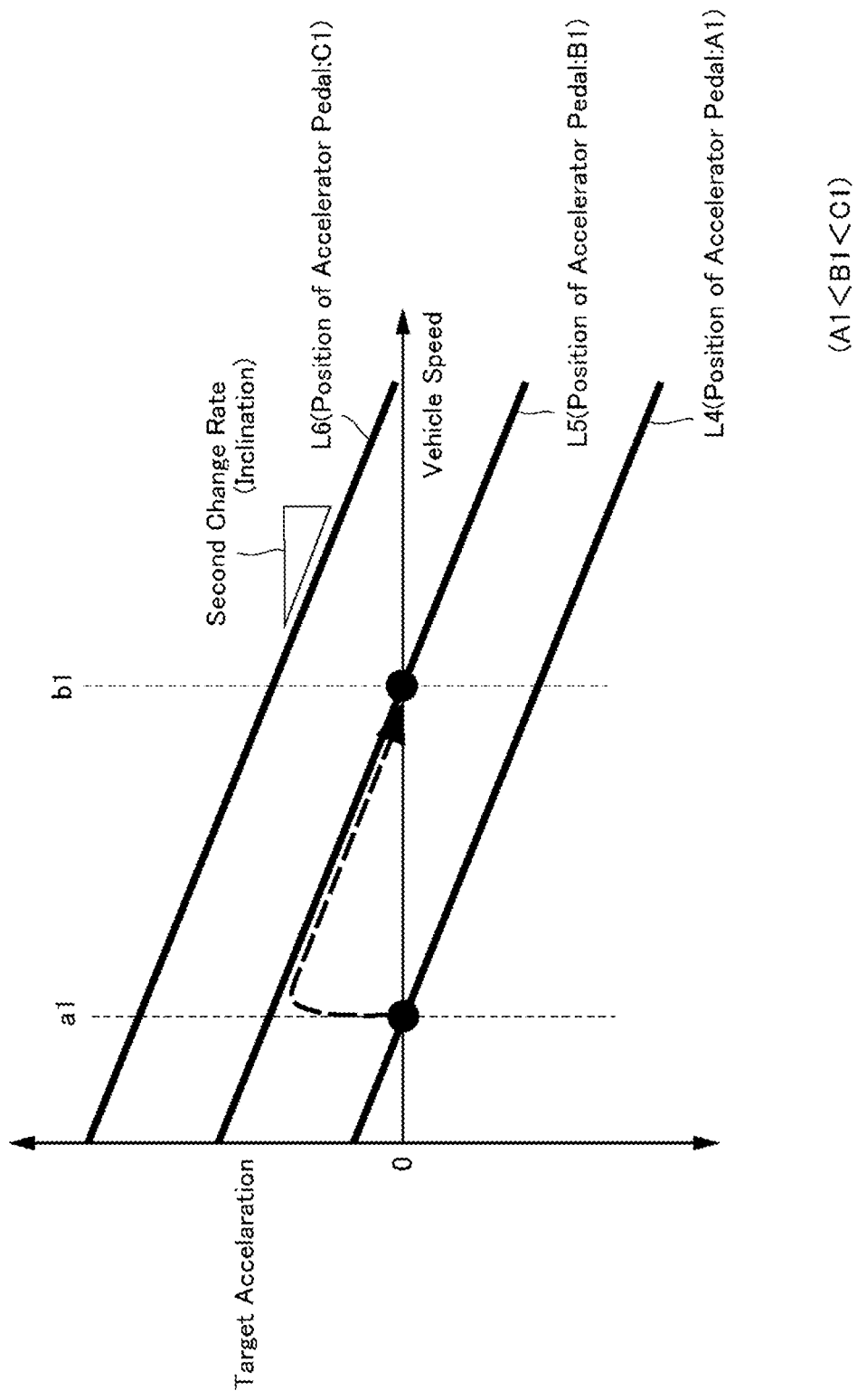
FIG. 4 is a map determining the target acceleration with respect to a vehicle speed in the normal mode at the second change rate.

The second change rate employed in the normal mode is greater than an after-mentioned third change rate selected in the sport mode. In other words, an inclination of each line indicating the second change rate in after-mentioned FIG. 4 is individually steeper than an inclination of each line indicating the third change rate in after-mentioned FIG. 7. Therefore, clearances between the lines L1 and L2 and between the lines L1 and L3 shown in FIG. 3 are wider than clearances between the lines L7 and L8 and the lines L7 and L9 shown in after-mentioned FIG. 6, respectively.

FIG. 4 is a map determining the target acceleration with respect to the speed of the vehicle Ve in the normal mode at the second change rate. In FIG. 4, specifically, the line L4 indicates a relation between the target acceleration and the vehicle speed given that the accelerator pedal 4 is positioned at a position A1, the line L5 indicates a relation between the target acceleration and the vehicle speed given that the accelerator pedal 4 is positioned at a position B1, and the line L6 indicates a relation between the target acceleration and the vehicle speed given that the accelerator pedal 4 is positioned at a position C1. Here, a depression of the accelerator pedal 4 at the position A1 is less than a depression of the accelerator pedal 4 at the position B1, and the depression of the accelerator pedal 4 at the position B1 is less than a depression of the accelerator pedal 4 at the position C1 (A1<B1<C1). As can be seen from FIG. 4, inclinations of the lines L4, L5, and L6 (i.e., the second change rate) are identical to one another.

In the case of decreasing the target acceleration in the normal mode, as shown in FIG. 4, the target acceleration is decreased at the second change rate in accordance with an increase in the vehicle speed. Specifically, the second change rate is a ratio of a change amount of the vehicle speed to a change amount of the target acceleration, and in FIG. 4, the second change rate is indicated as an inclination of each of the lines L4, L5, and L6. According to the embodiment of the present invention, the ratio between the change amount of the vehicle speed and the change amount of the target acceleration is altered depending on the selected operating mode. Specifically, the second change rate is employed to decrease the target acceleration in the normal mode, whereas, the third change rate that is smaller than the second change rate is employed to decrease the target acceleration in the sport mode. That is, the third change rate to decrease the target acceleration with respect to an increase in the vehicle speed is smaller than the second change rate. In other words, an inclination of each line indicating the second change rate in FIG. 4 is individually steeper than an inclination of each line indicating the third change rate in FIG. 7.

Thus, according to the embodiment of the present invention, each of the lines L1, L2, L3, L4, L5, and L5 indicating the first acceleration characteristic are changed linearly in the maps shown in FIGS. 3 and 4. However, the first acceleration characteristic may be modified to vary the target acceleration in a quadratic manner, a logarithmic manner, or a stepwise manner. The first acceleration characteristic may also be determined by a functional formula defining a relation between the target acceleration and the depression of the accelerator pedal or the vehicle speed. Instead, the first acceleration characteristic may also be determined by a control table defining a relation between the target acceleration and the depression of the accelerator pedal or the vehicle speed.

Figure 5:
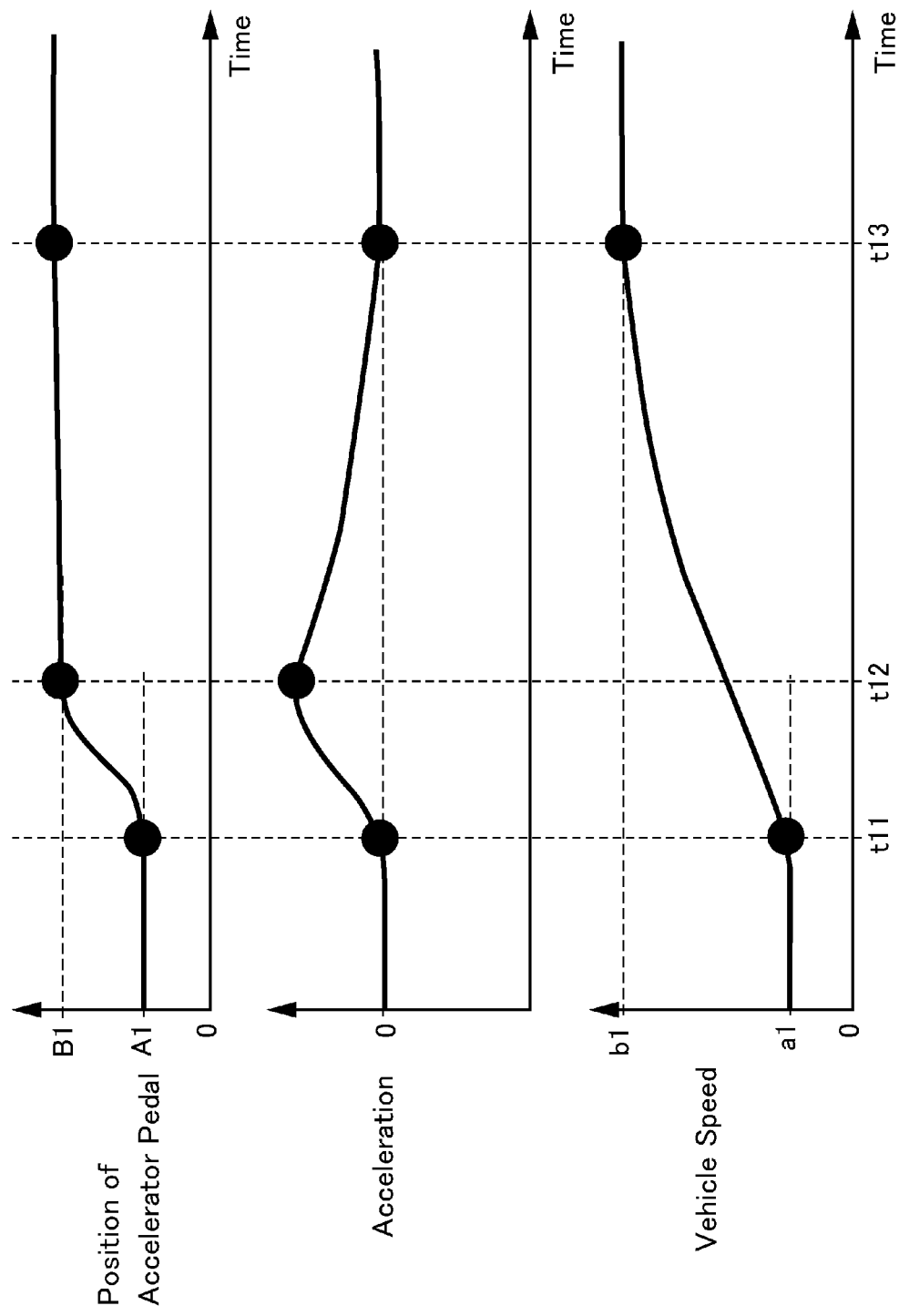
FIG. 5 is a time chart showing temporal changes in the acceleration and the speed of the vehicle in the normal mode in which the first acceleration characteristic is employed.

Turning to FIG. 5, there are shown the acceleration and the speed of the vehicle Ve changed in the normal mode in which the first acceleration characteristic shown in FIGS. 3 and 4 is employed. Before point t11, the accelerator pedal 4 is positioned at the position A1. The accelerator pedal 4 is depressed by the driver at point t11 so that the position of the accelerator pedal 4 is changed to the position B1 at point t12. Consequently, the target acceleration is increased so that the acceleration of the vehicle Ve is increased from point t11 to point t12, and the speed of the vehicle Ve is increased from a1 to b1 during the period from point t11 to point t13. The accelerator pedal 4 is maintained to the position B1 after point t12. When the speed of the vehicle Ve is raised to b1, as indicated by the arrows in FIGS. 3 and 4, the target acceleration is decreased to zero. Therefore, the speed of the vehicle Ve is stabilized after point t13.

Thus, in the normal mode in which the first acceleration characteristic is employed, the vehicle Ve can be cruised at the speed b1 by maintaining the position of the accelerator pedal 4 to the position B1 after depressing the accelerator pedal 4 from the position A1. That is, in the normal mode, the speed of the vehicle Ve is determined by fixing the position of the accelerator pedal 4. This means that the vehicle speed depends on the position of the accelerator pedal stronger than the acceleration. In the normal mode, therefore, the driver is allowed to control the vehicle speed easily by manipulating the accelerator pedal 4. For example, in the urban area or congested road, the driver is required to change the vehicle speed frequently. However, operating frequency and an operating amount of the accelerator pedal 4 may be reduced by selecting the normal mode so as to alleviate fatigue of the driver resulting from operating the accelerator pedal 4.

Whereas, in the sport mode, the controller 6 employs the second acceleration characteristic to propel the vehicle Ve in a dynamic manner. In a case that the second acceleration characteristic is employed, the target acceleration is also increased in accordance with an increase in depression of the accelerator pedal 4 at the first change rate, but the target acceleration is decreased in accordance with an increase in the vehicle speed at the third change rate that is smaller than the second change rate. Specifically, the third acceleration characteristic is determined with reference to maps shown in FIGS. 6 and 7.

Figure 6:
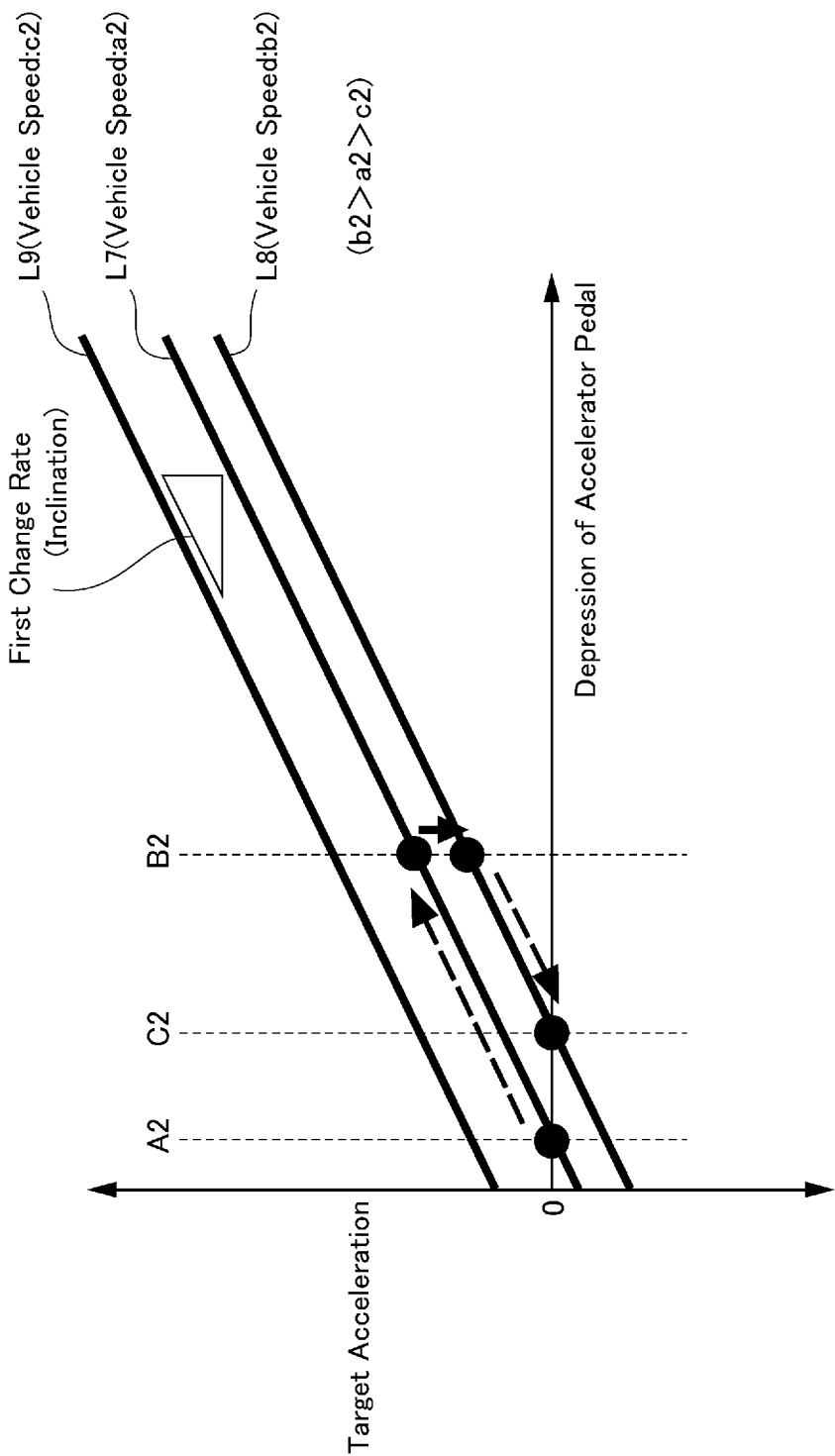
FIG. 6 is a map determining the target acceleration with respect to a position of the accelerator pedal in the sport mode at the first change rate.

Specifically, FIG. 6 is a map determining the target acceleration with respect to the position of the accelerator pedal 4 in the sport mode at the first change rate. In FIG. 6, the line L7 indicates a relation between the target acceleration and the position of the accelerator pedal 4 given that the vehicle speed is a2, the line L8 indicates a relation between the target acceleration and the position of the accelerator pedal 4 given that the vehicle speed is b2, and the line L9 indicates a relation between the target acceleration and the position of the accelerator pedal 4 given that the vehicle speed is c2. Here, the vehicle speed b2 is faster than the vehicle speed a2, and the vehicle speed a2 is faster than the vehicle speed c2 (b2>a2>c2). As can be seen from FIG. 6, inclinations of the lines L7, L8, and L9 (i.e., the first change rate) are identical to one another.

In the case that the first acceleration characteristic is employed in the sport mode, as shown in FIG. 6, the target acceleration is increased in accordance with an increase in depression of the accelerator pedal 4 at the first change rate. In this case, the first change rate is indicated as an inclination of each of the lines L7, L8, and L9. Thus, the ratio of a change amount of a position of the accelerator pedal 4 to a change amount of the target acceleration is also set to the first acceleration change rate as a fixed rate. That is, the target acceleration is increased in accordance with an increase in depression of the accelerator pedal 4 at the first acceleration change rate in both of the normal mode and the sport mode. In other words, an increasing rate of the target acceleration with respect to an increase in depression of the accelerator pedal 4 will not be changed even if the operating mode is shifted between the normal mode and the sport mode. According to the embodiment of the present invention, therefore, the vehicle Ve can be propelled in a dynamic manner by shifting the operating mode from the normal mode to the sport mode while preventing the driver from feeling uncomfortable feeling.

Figure 7:
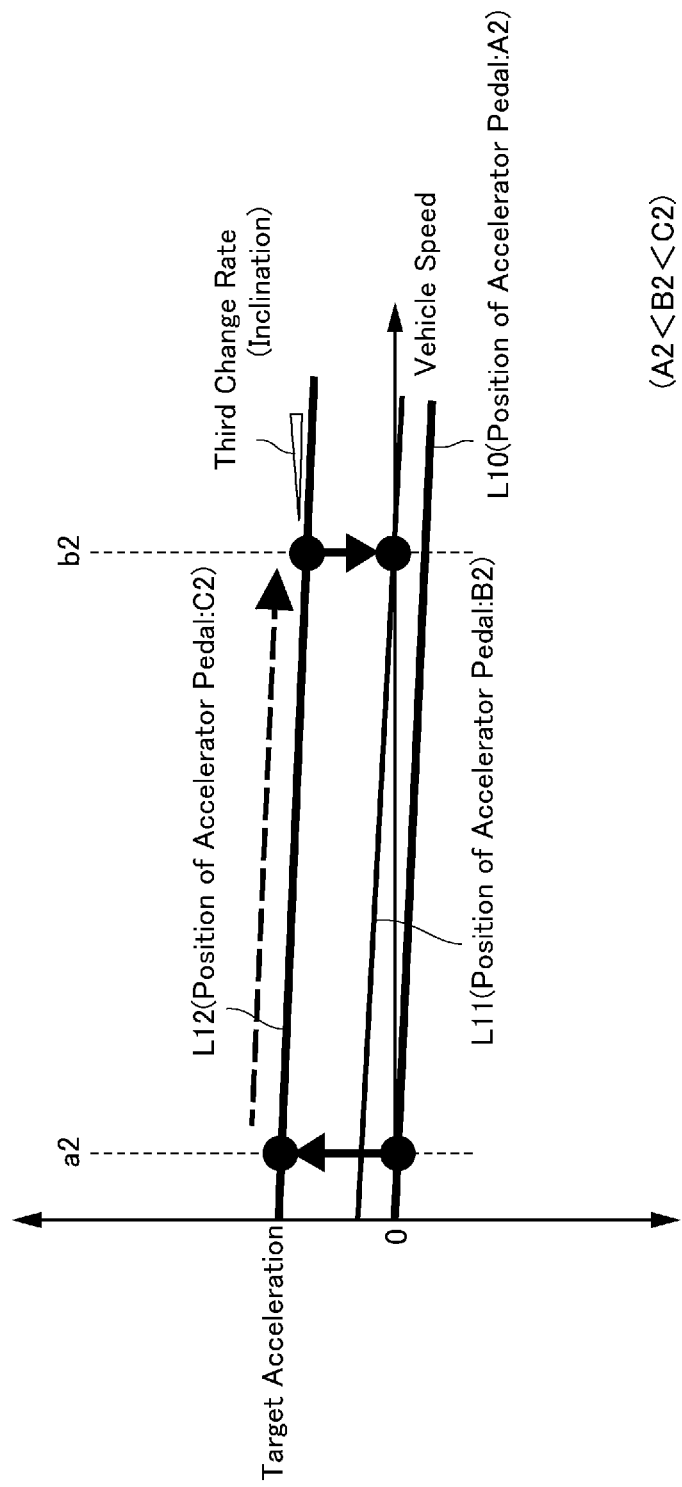
FIG. 7 is a map determining the target acceleration with respect to a vehicle speed in the sport mode at the third change rate.

The third change rate employed in the sport mode to decrease the target acceleration is smaller than the second change rate selected in the normal mode. In other words, an inclination of each line indicating the third change rate in after-mentioned FIG. 7 is individually milder than the inclination of each line indicating the second change rate in above-mentioned FIG. 4. Therefore, clearances between the lines L7 and L8 and between the lines L7 and L9 shown in FIG. 6 are narrower than the clearances between the lines L1 and L2 and the lines L1 and L3 shown in the above-mentioned FIG. 3, respectively.

FIG. 7 is a map determining the target acceleration with respect to the speed of the vehicle Ve in the sport mode at the third change rate. In FIG. 7, specifically, the line L10 indicates a relation between the target acceleration and the vehicle speed given that the accelerator pedal 4 is positioned at a position A2, the line L11 indicates a relation between the target acceleration and the vehicle speed given that the accelerator pedal 4 is positioned at a position B2, and the line L12 indicates a relation between the target acceleration and the vehicle speed given that the accelerator pedal 4 is positioned at a position C2. Here, a depression of the accelerator pedal 4 at the position A2 is less than a depression of the accelerator pedal 4 at the position B2, and the depression of the accelerator pedal 4 at the position B2 is less than a depression of the accelerator pedal 4 at the position C2 (A2<B2<C2). As can be seen from FIG. 7, inclinations of the lines L10, L11, and L12 (i.e., the third change rate) are identical to one another.

In the case of decreasing the target acceleration in the sport mode, as shown in FIG. 7, the target acceleration is decreased at the third change rate in accordance with an increase in the vehicle speed. Specifically, the third change rate is a ratio of a change amount of the vehicle speed to a change amount of the target acceleration, and in FIG. 7, the third change rate is indicated as an inclination of each of the lines L10, L11, and L12. According to the embodiment of the present invention, the ratio between a change amount of the vehicle speed and a change amount of the target acceleration is altered depending on the selected operating mode. Specifically, the second change rate is employed in the normal mode to decrease the target acceleration, whereas, the third change rate that is smaller than the second change rate is employed in the sport mode to decrease the target acceleration.

Thus, according to the embodiment of the present invention, each of the lines L7, L8, L9, L10, L11, and L12 indicating the second acceleration characteristic are changed linearly in the maps shown in FIGS. 6 and 7. However, the second acceleration characteristic may also be modified to vary the target acceleration in a quadratic manner, a logarithmic manner, or a stepwise manner. The second acceleration characteristic may also be determined by a functional formula defining a relation between the target acceleration and the depression of the accelerator pedal or the vehicle speed. Instead, the second acceleration characteristic may also be determined by a control table defining a relation between the target acceleration and the depression of the accelerator pedal or the vehicle speed.

Figure 8:
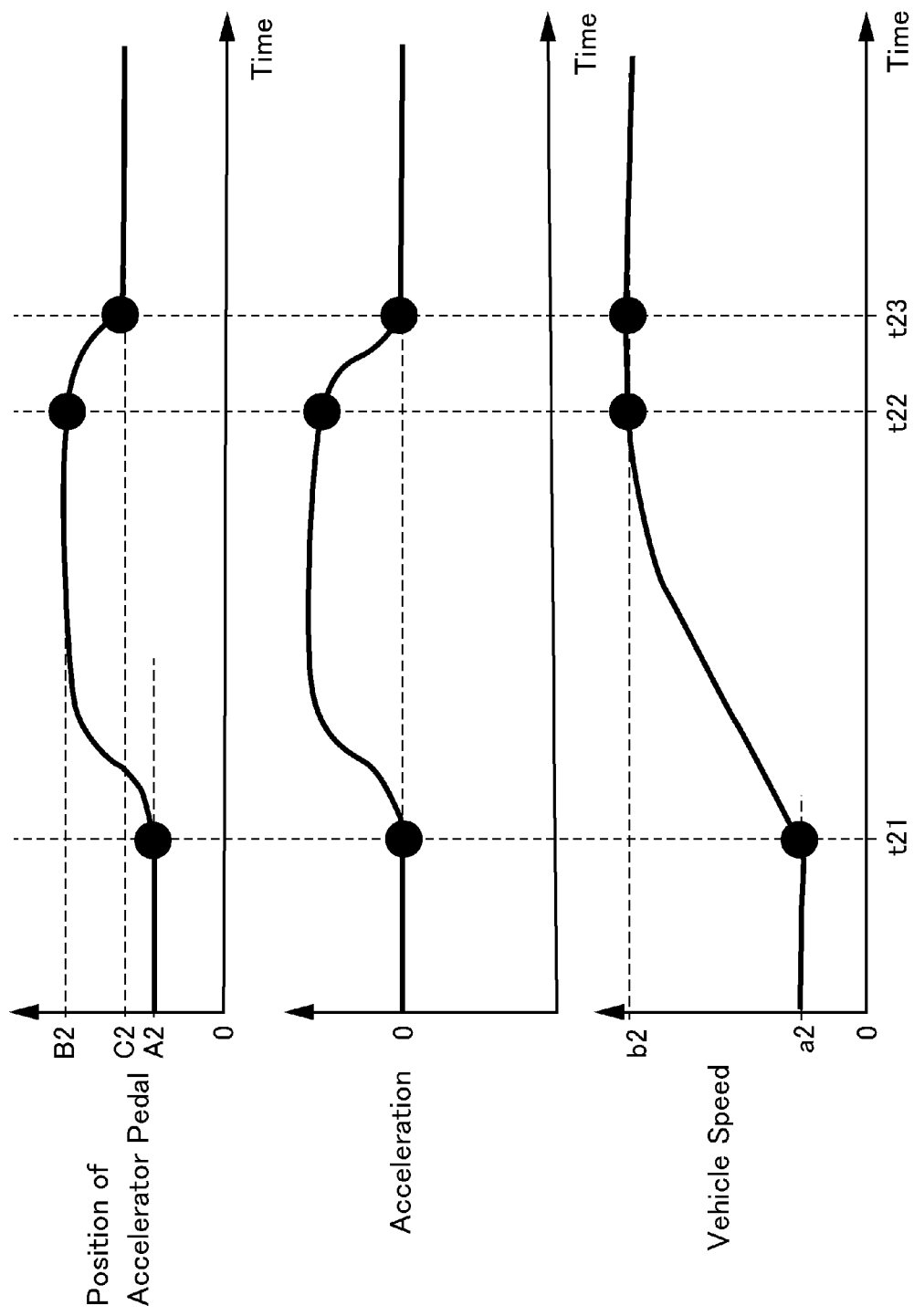
FIG. 8 is a time chart showing temporal changes in the acceleration and the speed of the vehicle in the sport mode in which the second acceleration characteristic is employed.

Turning to FIG. 8, there are shown the acceleration and the speed of the vehicle Ve changed in the sport mode in which the second acceleration characteristic shown in FIGS. 6 and 7 is employed. Before point t21, the accelerator pedal 4 is positioned at the position A2. The accelerator pedal 4 is depressed by the driver at point t21 so that the position of the accelerator pedal 4 is changed to the position B2 at point t22. Consequently, the target acceleration is increased so that the acceleration of the vehicle Ve is increased from point t21 to point t22, and the speed of the vehicle Ve is increased from a2 to b2 during the period from point t21 to point t22. In this case, as indicated by the arrows in FIGS. 6 and 7, the target acceleration has not yet been decreased to zero and still remains a predetermined positive value. That is, if the position of the accelerator pedal 4 is fixed in this situation, the speed of the vehicle Ve will be further increased from b2. In order to stabilize the speed of the vehicle Ve, therefore, the accelerator pedal 4 is returned from the position B2 to the position C2 at point t23. Consequently, the target acceleration is decreased to zero, and the speed of the vehicle Ve is stabilized after point t23.

Thus, in the sport mode in which the second acceleration characteristic is employed, the vehicle Ve can be cruised at the speed b2 by returning the accelerator pedal 4 to the position C2 after depressing the accelerator pedal 4 from the position A2 to the position B2. That is, in the sport mode, the acceleration of the vehicle Ve is changed quickly in response to the change in the position of the accelerator pedal 4. This means that the acceleration depends on the position of the accelerator pedal stronger than the vehicle speed. In the sport mode, therefore, the driver is allowed to control the acceleration of the vehicle Ve in a dynamic manner compared to the normal mode. For example, when the driver intends to accelerate the vehicle Ve promptly, greater acceleration to accelerate the vehicle Ve can be generated continuously by depressing the accelerator pedal 4 and thereafter maintaining the position of the accelerator pedal 4. That is, the vehicle Ve accelerated quickly by a simple operation. In the sport mode, therefore, agility of the vehicle Ve can be enhanced compared to the normal mode.

Thus, according to the embodiment of the present invention, the speed of the vehicle Ve can be controlled easily in the normal mode by manipulating the accelerator pedal 4. Whereas, in the sport mode, the acceleration of the vehicle Ve can be changed quickly in a dynamic manner in response to an operation of the accelerator pedal 4. According to the embodiment of the present invention, therefore, the vehicle Ve can be operated in line with the driver's intention in each operating mode.

Figure 9:
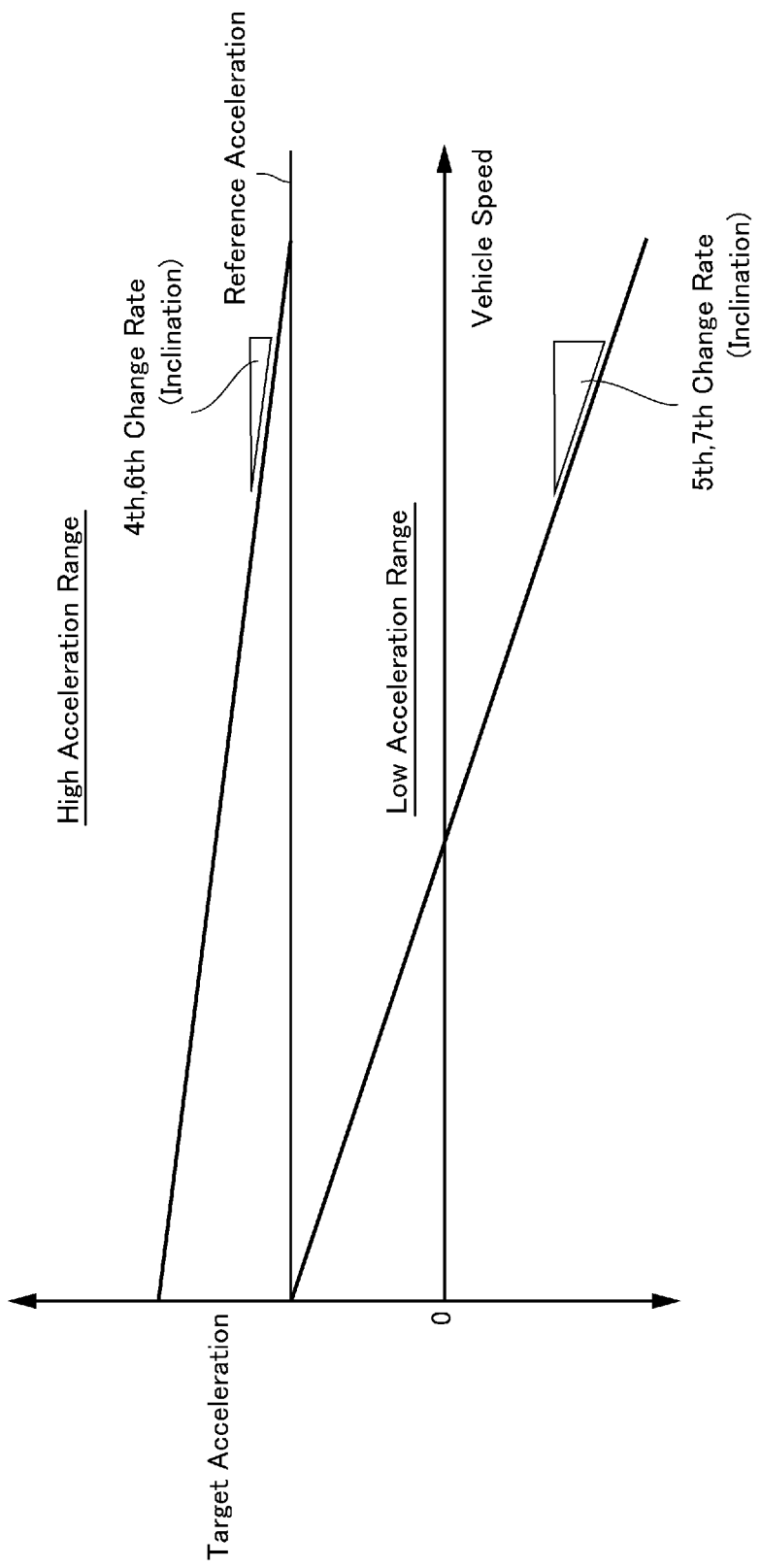
FIG. 9 is a map for changing the reduction rate of the target acceleration in a high-acceleration range and a low-acceleration range.

FIG. 9 is a map used in another embodiment of the present invention to decrease the target acceleration. As shown in FIG. 9, according to another embodiment, a range of the target acceleration is divided into a high-acceleration range and a low-acceleration range across a reference acceleration value. The reference acceleration as a boundary between the high-acceleration range and the low-acceleration range is set to a predetermined positive value based on a result of experimentation or simulation.

According to another embodiment shown in FIG. 9, the first acceleration characteristic is also employed in the normal mode. In the case that the normal mode is selected, in the high-acceleration range, the target acceleration is decreased in accordance with an increase in the speed of the vehicle Ve at a fourth change rate that is smaller than the second change rate. Whereas, in the low-acceleration range, the target acceleration is decreased in accordance with an increase in the speed of the vehicle Ve at a fifth change rate that is greater than the fourth change rate. Here, it is to be noted that the fourth change rate may be identical to the second change rate.

Likewise, according to another embodiment shown in FIG. 9, the second acceleration characteristic is also employed in the sport mode. In the case that the sport mode is selected, in the high-acceleration range, the target acceleration is decreased in accordance with an increase in the speed of the vehicle Ve at a sixth change rate that is smaller than the third change rate. Whereas, in the low-acceleration range, the target acceleration is decreased in accordance with an increase in the speed of the vehicle Ve at a seventh change rate that is greater than the sixth change rate. Here, it is to be noted that the sixth change rate may be identical to the third change rate.

Thus, according to another embodiment shown in FIG. 9, in both of the normal mode and the sport mode, the change rate (i.e., reduction rate) of the target acceleration with respect to an increase in the vehicle speed is increased in the low-acceleration range, and reduced in the high-acceleration range. According to another embodiment shown in FIG. 9, therefore, speed of the vehicle Ve can be controlled easily in the low-acceleration range, and acceleration of the vehicle Ve can be controlled easily in the high-acceleration range. For these reasons, the vehicle Ve can be operated in line with the driver's intention based on the target acceleration.

Figure 10:
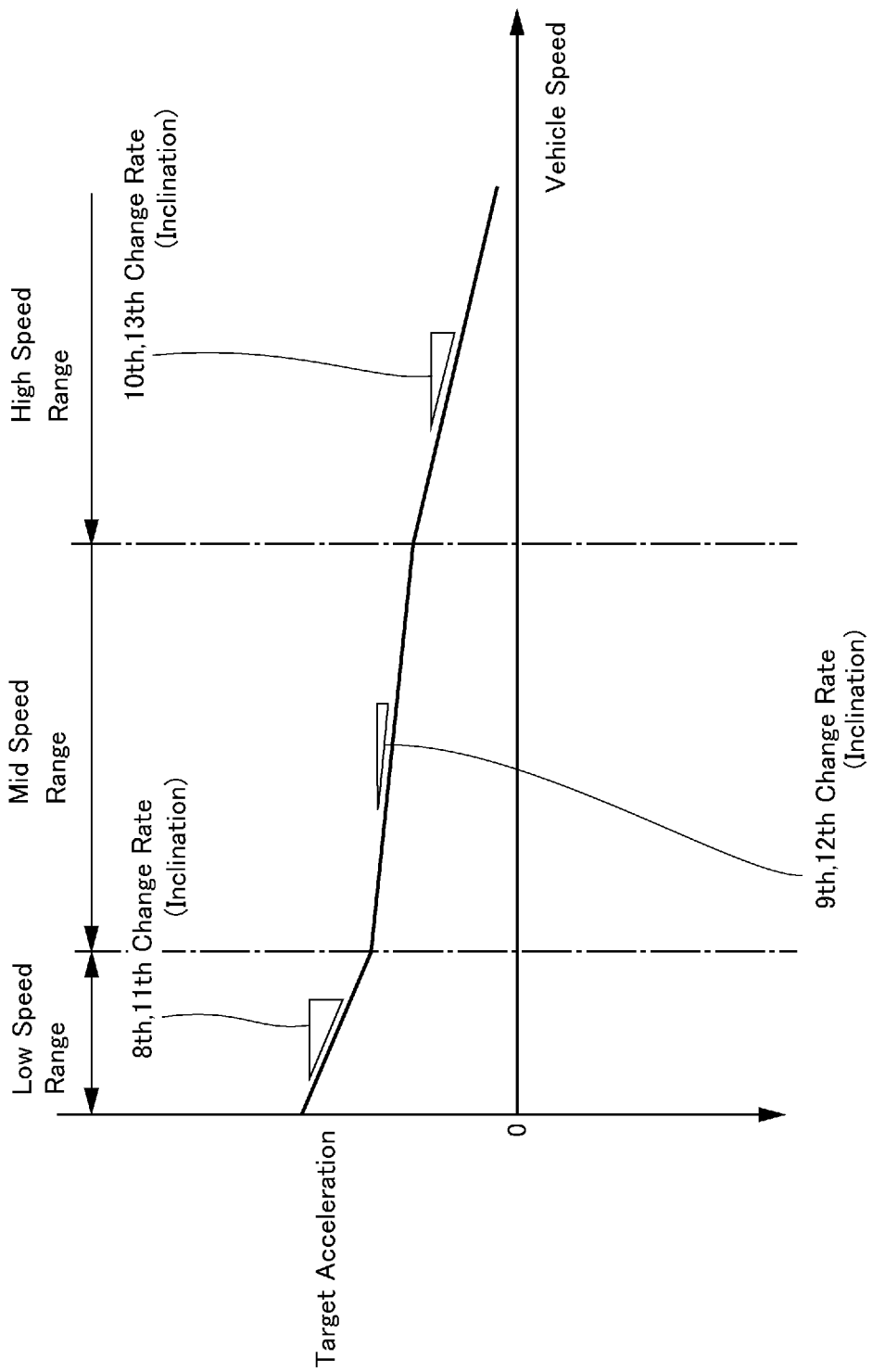
FIG. 10 is a map a map for changing the reduction rate of the target acceleration in a low-speed range, a mid-speed range, and a high-speed range.

FIG. 10 is a map used in still another embodiment of the present invention to decrease the target acceleration. As shown in FIG. 10, according to still another embodiment, a speed range of the vehicle Ve to decrease the target acceleration is divided into a high-speed range, mid-speed range, and a low-speed range. For example, a boundary speed between the low-speed range and the mid-speed range is set between 20 and 30 km/h, and a boundary speed between the mid-speed range and the high-speed range is set between 80 and 1000 km/h. Those boundary speeds are also set based on a result of experimentation or simulation.

According to still another embodiment shown in FIG. 10, the first acceleration characteristic is also employed in the normal mode. In the case that the normal mode is selected, in the low-speed range, the target acceleration is decreased in accordance with an increase in the speed of the vehicle Ve at an eighth change rate that is greater than the second change rate. In the mid-speed range, the target acceleration is decreased in accordance with an increase in the speed of the vehicle Ve at a ninth change rate that is smaller than the eighth change rate. In the high-speed range, the target acceleration is decreased in accordance with an increase in the speed of the vehicle Ve at a tenth change rate that is greater than the ninth change rate. Here, it is to be noted that the eighth change rate may be identical to the second change rate.

Likewise, according to still another embodiment shown in FIG. 10, the second acceleration characteristic is also employed in the sport mode. In the case that the sport mode is selected, in the low-speed range, the target acceleration is decreased in accordance with an increase in the speed of the vehicle Ve at an eleventh change rate that is greater than the third change rate. In the mid-speed range, the target acceleration is decreased in accordance with an increase in the speed of the vehicle Ve at a twelfth change rate that is smaller than the eleventh change rate. In the high-speed range, the target acceleration is decreased in accordance with an increase in the speed of the vehicle Ve at a thirteenth change rate that is greater than the twelfth change rate. Here, it is to be noted that the eleventh change rate may be identical to the third change rate.

Thus, according to still another embodiment shown in FIG. 10, in both of the normal mode and the sport mode, the change rate (i.e., reduction rate) of the target acceleration with respect to an increase in the vehicle speed is increased in the low-speed range and the high-speed range, and reduced in the mid-speed range. According to still another embodiment shown in FIG. 10, therefore, speed of the vehicle Ve can be controlled easily in the low-speed range and the high-speed range, and acceleration of the vehicle Ve can be controlled easily in the mid-speed range. For these reasons, the vehicle Ve can be operated in line with the driver's intention depending on the running condition and speed of the vehicle Ve.

What is claimed is:

1. A vehicle control system, comprising:
   a detector comprising a sensor that detects an operating amount of an accelerator and a speed of a vehicle; and
   a controller that is configured to
   set an acceleration characteristic determining a relation among a target acceleration, the operating amount of the accelerator, and the speed of the vehicle,
   calculate the target acceleration with respect to the operating amount of the accelerator or the speed of the vehicle based on the acceleration characteristic,
   control an acceleration of the vehicle based on the calculated target acceleration,
   select an operating mode of the vehicle from a normal mode in which a first acceleration characteristic as a standard acceleration characteristic is employed, and a sport mode in which a second acceleration characteristic to propel the vehicle is employed,
   when the first acceleration characteristic is employed in the normal mode:
   (1) increase the target acceleration in accordance with an increase in the operating amount of the accelerator at a first change rate, wherein the first change rate comprises a ratio of (A) a change amount of between two positions of the accelerator to (B) a change amount between two target accelerations, and
   (2) decrease the target acceleration in accordance with an increase in the speed of the vehicle at a second change rate, wherein the second change rate comprises a ratio of (A) a change amount between two vehicle speeds to (B) a change amount of two target accelerations, and wherein each target acceleration comprises a rate of change of velocity, and
   when the second acceleration characteristic is employed in the sport mode:
   (1) linearly increase the target acceleration in accordance with an increase in the operating amount of the accelerator at the first change rate, and
   (2) decrease the target acceleration in accordance with an increase in the speed of the vehicle at a third change rate that is smaller than the second change rate.

2. The vehicle control system as claimed in claim 1, wherein the controller is further configured to
   decrease the target acceleration in accordance with an increase in the speed of the vehicle at a fourth change rate that is smaller than the second change rate in a high-acceleration range that is higher than a reference acceleration value, and decrease the target acceleration in accordance with an increase in the speed of the vehicle at a fifth change rate that is greater than the fourth change rate in a low-acceleration range that is lower than the reference acceleration value, when the first acceleration characteristic is employed in the normal mode, and
   decrease the target acceleration in accordance with an increase in the speed of the vehicle at a sixth change rate that is smaller than the third change rate in the high-acceleration range, and decrease the target acceleration in accordance with an increase in the speed of the vehicle at a seventh change rate that is greater than the sixth change rate in the low-acceleration range, when the second acceleration characteristic is employed in the sport mode.

3. The vehicle control system as claimed in claim 1, wherein the controller is further configured to
   decrease the target acceleration in accordance with an increase in the speed of the vehicle at an eighth change rate that is greater than the second change rate in a low-speed range that is lower than a lower boundary speed, decrease the target acceleration in accordance with an increase in the speed of the vehicle at a ninth change rate that is smaller than the eighth change rate in a mid-speed range that is higher than the lower boundary speed but lower than a higher boundary speed, and decrease the target acceleration in accordance with an increase in the speed of the vehicle at a tenth change rate that is greater than the ninth change rate in a high-speed range that is higher than the higher boundary speed, when the first acceleration characteristic is employed in the normal mode, and
   decrease the target acceleration in accordance with an increase in the speed of the vehicle at an eleventh change rate that is greater than the third change rate in the low-speed range, decrease the target acceleration in accordance with an increase in the speed of the vehicle at a twelfth change rate that is smaller than the eleventh change rate in the mid-speed range, and decrease the target acceleration in accordance with an increase in the speed of the vehicle at a thirteenth change rate that is greater than the twelfth change rate in the high-speed range, when the second acceleration characteristic is employed in the sport mode.

\* \* \* \* \*